US010507990B2

(12) United States Patent
Koga et al.

(10) Patent No.: US 10,507,990 B2
(45) Date of Patent: Dec. 17, 2019

(54) ARTICLE TRANSPORT SYSTEM AND TRANSPORT SYSTEM CONTROLLER

(71) Applicant: FANUC CORPORATION, Yamanashi (JP)

(72) Inventors: Kentaro Koga, Yamanashi (JP); Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/039,330

(22) Filed: Jul. 19, 2018

(65) Prior Publication Data
US 2019/0031452 A1   Jan. 31, 2019

(30) Foreign Application Priority Data

Jul. 26, 2017 (JP) ................. 2017-144592

(51) Int. Cl.
*G06T 7/20* (2017.01)
*B65G 47/90* (2006.01)
(Continued)

(52) U.S. Cl.
CPC .......... *B65G 47/905* (2013.01); *B65G 43/08* (2013.01); *G06T 7/20* (2013.01); *B25J 9/1697* (2013.01);
(Continued)

(58) Field of Classification Search
CPC .................. B65G 47/905; B65G 43/08; B65G 2203/041; B65G 2203/0233;
(Continued)

(56) References Cited

U.S. PATENT DOCUMENTS

| 2003/0142784 A1* | 7/2003 | Suzuki ............... G01N 23/04 378/58 |
| 2005/0075752 A1* | 4/2005 | Ban ................... B25J 9/1697 700/213 |

(Continued)

FOREIGN PATENT DOCUMENTS

| JP | H6-253309 A | 9/1994 |
| JP | H8-63214 A  | 3/1996 |

(Continued)

OTHER PUBLICATIONS

Shin, Ik Sang, Sang-Hyun Nam, Hyun Geun Yu, Rodney G. Roberts, and Seungbin B. Moon. "Conveyor visual tracking using robot vision." In Proceedings of 2006 Florida Conference on Recent Advances in Robotics, pp. 1-5. 2006. (Year: 2006).*

*Primary Examiner* — Carol Wang
(74) *Attorney, Agent, or Firm* — Hauptman Ham, LLP

(57) ABSTRACT

An article transport system with few missed detections, and a controller used in the system. The system includes: a conveyor that sequentially transports plural workpieces; a conveyor sensor that obtains conveyance operation information of the conveyor; an arrival sensor that senses the arrival of each workpiece; a camera that captures an image of each workpiece; a position detection processing section that detects the workpiece from the image, and identifies a position of the workpiece on the conveyor; a movement distance designation section that designates first and second movement distances; an image capturing control section that controls the camera to capture an image of the workpiece upon the conveyor advancing by the first movement distance after the arrival of the workpiece has been sensed, and each time the conveyor advances by the second movement distance; and a number designation section that designates an upper limit number for the detection process.

6 Claims, 5 Drawing Sheets

(51) Int. Cl.
*B65G 43/08* (2006.01)
*B25J 9/16* (2006.01)

(52) U.S. Cl.
CPC .............. *B65G 2203/025* (2013.01); *B65G 2203/0225* (2013.01); *B65G 2203/0233* (2013.01); *B65G 2203/041* (2013.01)

(58) Field of Classification Search
CPC ...... B65G 2203/0225; B65G 2203/025; G06T 7/20; B25J 9/1697
See application file for complete search history.

(56) References Cited

U.S. PATENT DOCUMENTS

| | | | |
|---|---|---|---|
| 2009/0244284 A1* | 10/2009 | Suita | G01M 17/02 348/148 |
| 2016/0001983 A1* | 1/2016 | Ooba | B65G 37/00 414/787 |
| 2016/0151916 A1* | 6/2016 | Kanno | B25J 9/1697 700/228 |
| 2017/0066133 A1* | 3/2017 | Ooba | B25J 9/1697 |
| 2017/0116738 A1* | 4/2017 | Iida | H04N 13/0221 |

FOREIGN PATENT DOCUMENTS

| | | |
|---|---|---|
| JP | 2007-33328 A | 2/2007 |
| JP | 2014-182026 A | 9/2014 |
| JP | 2016-107349 A | 6/2016 |

\* cited by examiner

ARTICLE TRANSPORT SYSTEM AND TRANSPORT SYSTEM CONTROLLER

RELATED APPLICATIONS

The present application claims priority of Japanese Application Number 2017-144592, filed on Jul. 26, 2017, the disclosure of which is hereby incorporated by reference herein in its entirety.

BACKGROUND OF THE INVENTION

1. Field of the Invention

The present invention relates to an article transport system and a transport system controller.

2. Description of the Related Art

An article transport system in which an image of a workpiece transported by a conveyor is captured by a camera, a position of the workpiece is detected through image processing on the obtained image, and a robot carries out a picking operation on the basis of the detected position of the workpiece is known (e.g. see JP 2007-033328 A and JP H08-063214 A).

The field of view of a camera may be narrowed to improve the detection accuracy of the camera, but in a case where workpieces are densely transported, it may not be possible to correctly identify all of the workpieces. An arrival sensor can be provided on the upstream side of the camera to find the timing at which the workpieces will enter the field of view of the camera; however, depending on the shape of the workpiece, the leading end of the workpiece or the following end of the workpiece may be sensed, and it is thus difficult to know the precise timing.

SUMMARY OF THE INVENTION

One aspect of the present disclosure is an article transport system including: a conveyor configured to transport a plurality of articles; a conveyor sensor configured to obtain conveyance operation information of the conveyor; an arrival sensor configured to sense an arrival of each of the plurality of articles; an image capturing apparatus configured to capture an image of each of the plurality of articles transported on the conveyor; a position detection processing section configured to detect each of the plurality of articles from the image captured by the image capturing apparatus, and carry out a detection process identifying a position of each of the plurality of articles; a movement distance designation section configured to designate a first movement distance determined, based on a velocity of the conveyor and a time required for the detection process, and a second movement distance determined, based on the velocity of the conveyor, a time required for the image capturing process of the image capturing apparatus, and the time required for the detection process; an image capturing control section configured to control the image capturing apparatus to capture an image of each of the plurality of articles upon the conveyor advancing the first movement distance after the arrival of the article has been sensed, and then, to capture an image of each of the plurality of articles each time the conveyor advances the second movement distance; and a number designation section configured to designate a maximum number of times for the image capturing process to be carried out by the image capturing apparatus, wherein the position detection processing section sequentially carries out the detection process for the images obtained by the image capturing apparatus after the image capturing apparatus has completed the image capturing processes a number of times, a maximum of the number of times being the maximum number of times, and aborts the detection process at a point in time when the detection process has succeeded.

Another aspect of the present disclosure is a transport system controller used in an article transport system, the article transport system including: a conveyor configured to transport a plurality of articles; a conveyor sensor configured to obtain conveyance operation information of the conveyor; an arrival sensor configured to sense an arrival of each of the plurality of articles; and an image capturing apparatus configured to capture an image of each of the plurality of articles transported on the conveyor, the transport system controller including: a position detection processing section configured to detect each of the plurality of articles from the image captured by the image capturing apparatus, and carry out a detection process identifying a position of each of the plurality of articles; a movement distance designation section configured to designate a first movement distance determined, based on a velocity of the conveyor and a time required for the detection process, and a second movement distance determined, based on the velocity of the conveyor, a time required for the image capturing process of the image capturing apparatus, and the time required for the detection process; an image capturing control section configured to control the image capturing apparatus to capture an image of each of the plurality of articles upon the conveyor advancing the first movement distance after the arrival of the article has been sensed, and then, to capture an image of each of the plurality of articles each time the conveyor advances the second movement distance; and a number designation section configured to designate a maximum number of times for the image capturing processes to be carried out by the image capturing apparatus, wherein the position detection processing section sequentially carries out the detection process for the images obtained by the image capturing apparatus after the image capturing apparatus has completed the image capturing process a number of times, a maximum of the number of times being the maximum number of times, and aborts the detection process at a point in time when the detection process has succeeded.

BRIEF DESCRIPTION OF THE DRAWINGS

The above and other objects, features and advantages of the present invention will be made more apparent by the following description, of the preferred embodiments thereof, with reference to the accompanying drawings wherein.

DETAILED DESCRIPTION

Figure 1:
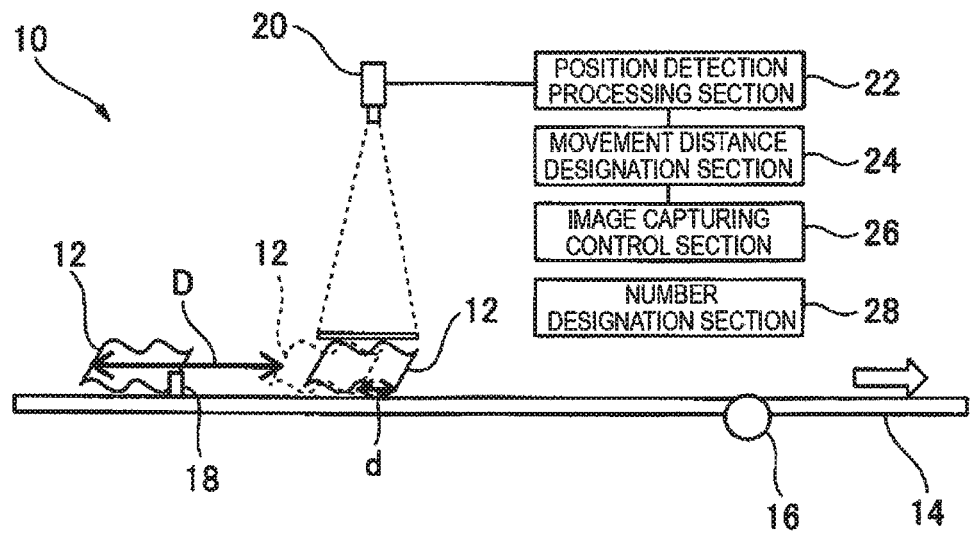
FIG. 1 is a diagram illustrating an example of the basic configuration of an article transport system.

FIG. 1 is a diagram illustrating an example of a basic configuration of an article transport system 10 according to the present disclosure. The article transport system 10 includes: a conveyor 14 that sequentially transports a plurality of articles (workpieces) 12; a conveyor sensor 16 that obtains conveyance operation information such as a movement amount and a transport velocity of the conveyor 14; an arrival sensor 18 that senses the workpieces 12 reaching (arriving at) a predetermined position on the conveyor 14; an image capturing apparatus 20, such as a camera, that is arranged downstream of the arrival sensor 18 with respect to a transport direction of the conveyor 14 and that captures an image of each workpiece 12 transported on the conveyor 14; a position detection processing section (image processing section) 22 that detects each workpiece 12 from the image captured by the camera 20 and carries out a detection process for identifying a position of the workpiece 12 on the conveyor 11; a movement distance designation section 24 that calculates and designates a first movement distance "D" determined on the basis of a velocity of the conveyor 11 and a time required for the detection process, and a second movement distance "d" determined on the basis of the velocity of the conveyor 14, a time required for the image capturing process by the camera 20 and the time required for the detection process; an image capturing control section 26 that controls the camera 20 to first capture an image of a workpiece 12 upon the conveyor 14 having advanced by the first movement distance D after the arrival of the workpiece 12 has been sensed, and then, to capture an image of the workpiece 12 each time the conveyor 14 advances by the second movement distance d; and a number designation section 28 that calculates and designates a maximum number of times "N" for the detection process to be carried out by the position detection processing section 22.

In the article transport system 10, the arrival of the workpiece 12 is sensed by the arrival sensor 18, and the camera 20 first captures an image of the workpiece 12 upon the conveyor 14 having advanced by the first movement distance D; after this first image is captured, the operation of the camera 20 capturing an image of the workpiece 12 each time the conveyor 14 advances by the second movement distance d is repeated a number of times with N being the maximum, and the position detection processing section 22 then carries out the detection process sequentially on the (maximum of N) images of the workpiece obtained by the camera 20. Here, once the detection process has succeeded for a given image, the detection process is aborted at that point in time, without carrying out the detection process (image processing) on all of the obtained images. A specific example of this will be described next using following embodiments.

Embodiment 1

Figure 2:
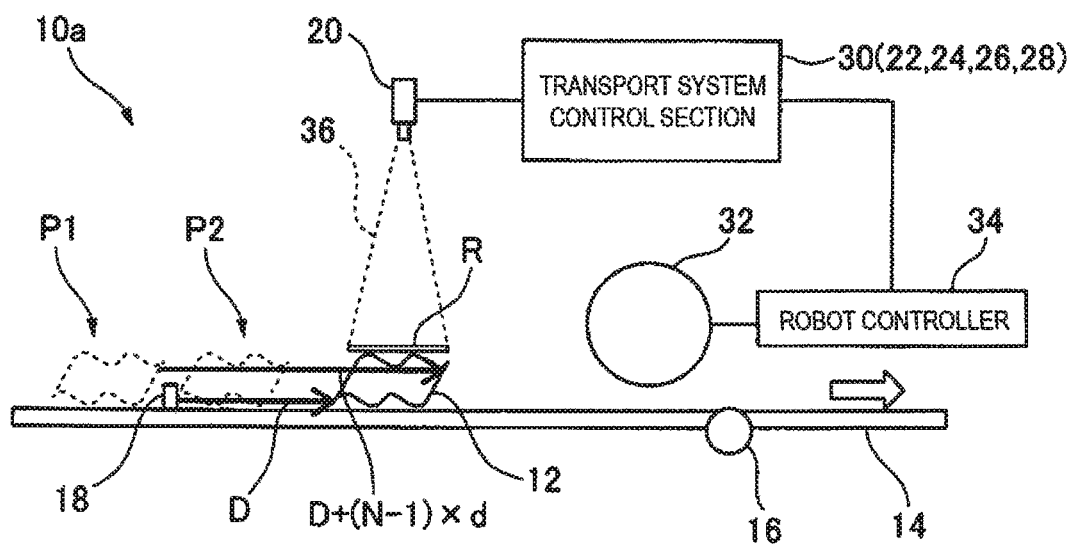
FIG. 2 is a diagram illustrating a first embodiment of the article transport system.

FIG. 2 is a diagram illustrating an article transport system 10a according to a first embodiment (Embodiment 1) of the present disclosure. The article transport system 10a includes the above-described conveyor 14, conveyor sensor 16, arrival sensor 18, and camera 20, as well as a transport system controller 30 that controls the camera 20, carries out image processing, etc., the transport system controller 30 includes (the functions of) the above-described position detection processing section 22, movement distance designation section 24, image capturing control section 26, and number designation section 28. Although the functions of the sections ln the transport system controller 30 can be realized by an arithmetic processing device such as a CPU, by memory, etc., some or all of the functions may be provided in a device aside from the transport system controller 30, such as a personal computer or a robot controller 34 (described later) connected to the system 10a.

The article transport system 10a includes a task machine 32 configured to carry out predetermined tasks, such as picking of the workpieces 12 transported on the conveyor 14 (which normally moves continuously at a constant velocity). The task machine 32 is, for example, a robot such as a vertical articulated robot including a hand, and operations of the robot 32 can be controlled by the robot controller 34, which is connected to the robot 32. Thus, on the basis of an image processing result (and more specifically, the position of the workpiece 12 on the conveyor 14 as identified by the position detection processing section 22), the robot 32 can carry out a picking operation such as holding or suctioning the workpiece 12, and can also transport the picked workpiece to a predetermined destination.

The arrival sensor 18 is preferably a non-contact sensor disposed on a side of the conveyor 14. Preferable specific examples thereof includes: a sensor that detects using light, such as a phototube sensor, a fiber sensor, or a laser sensor; a sensor that detects using eddy current, such as a proximity sensor or an eddy current displacement sensor; or a sensor that detects using ultrasonic waves, such as an ultrasound sensor. The arrival sensor 18 need not have a high-precision detection function, and for example, the arrival sensor 18 need not respond the instant a leading end of the workpiece arrives at a specific position on the conveyor 14 with respect to the transport direction of the conveyor 14. Thus, in the present embodiment, the arrival sensor 18 may respond (senses the arrival of a workpiece) upon a leading end (edge) of the workpiece reaching a position on the conveyor 14, and the arrival sensor 18 may respond upon a following end (edge) of the workpiece reaching that position, as described later.

The conveyor sensor 16 is configured to obtain the conveyance operation information, such as the transport velocity, etc., of the conveyor 14; for example, an encoder attached to a motor that drives the conveyor 14 can be used as the conveyor sensor 16. The camera disclosed in JP 2016-107349 A (e.g., the second camera 16B illustrated in FIG. 2 of that document) can be given as another preferable specific example of the conveyor sensor 16.

Figure 3:
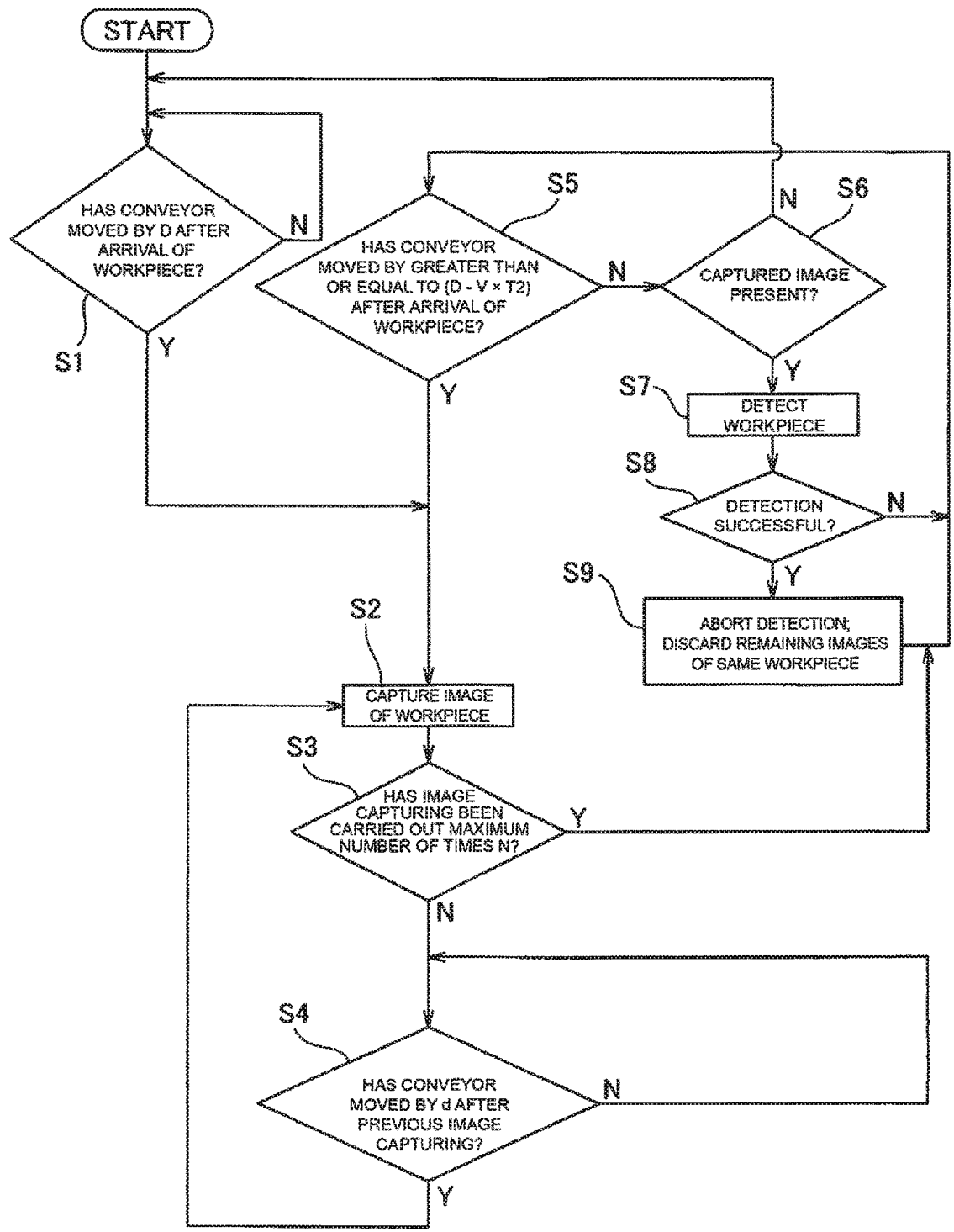
FIG. 3 is a flowchart illustrating an example of a flow of processing in the first embodiment.

Next, specific examples of the various processes carried out in the article transport system 10a will be described with reference to the flowchart in FIG. 3. Here, a case where a plurality of (K) workpieces 12 flow continuously on the conveyor 14 from upstream (the left side in FIG. 2) to downstream (the right side in FIG. 2) is considered, and it is assumed that the process of capturing an image of each workpiece 12 by the camera 20 (the control of the camera 20 by the image capturing control section 26) and the image processing (the position detection process) by the position detection processing section 22 cannot be carried out simultaneously. No special restrictions are placed on the type, shape, etc., of the workpieces 12. For example, the plurality of workpieces may be the same type and have the same dimensions; each workpiece may have flexibility, as with a retort pouch or an infusion solution bag (having a wavy surface), as illustrated in FIG. 2; the workpieces may have a consistent shape, as with machined parts; or the workpiece s may have individual differences in shapes (variations), as with agricultural crops.

The following parameters are set and used in the first embodiment.

T1: a maximum value of the time required for the camera to carry out a single image capturing process on a workpiece (including the time required to store the obtained image in suitable memory)

T2: a maximum value of the time required for the image processing (the workpiece position detection process) on a single image V: a velocity of the conveyor First, the camera 20 captures an image of a given (a first) workpiece 12 at the point in time when the conveyor 14 (the workpiece 12) has advanced by the first movement distance D after the arrival of the workpiece 12 has been sensed by the arrival sensor 18 (steps S1 and S2). Thereafter, the process of capturing an image of the workpiece 12 is repeated N times, which is a predetermined maximum number of times, each time the conveyor 14 advances by the second movement distance d (steps S3 and S4).

Here, the first movement distance D approximately corresponds to the distance between the arrival sensor 18 and (a field of view 36 of) the camera 20 with respect to the conveyor transport direction, and is determined on the basis of the conveyor velocity V and the time T2 required for the detection process; more specifically, the first movement distance D is the shortest possible distance at which a sufficient amount of time can be secured, between when a workpiece 12 is sensed by the arrival sensor 18 and when the workpiece 12 arrives at the field of view 36 of the camera 20, for the detection process to be completed for a single captured image of a workpiece already captured before the workpiece 12. Accordingly, a minimum value of D is equal to (V×T2). In other words, in a case where the first movement distance D is secured between the arrival sensor 18 and the camera 20, the distance traveled by the conveyor 14 from the latest timing at which the workpiece is sensed by the arrival sensor 18 (corresponding to a position P2 in FIG. 2) to when the workpiece 12 is completely inside the field of view 36 of the camera 20 corresponds to D.

The second movement distance d is determined on the basis of the conveyor velocity V, the image capturing process time T1, and the detection process time 12, and is set to satisfy Relationships (1) and (2) below, for example. This is because in a case where Relationship (1) is not satisfied, an image of the workpiece cannot be captured each time the conveyor 14 moves by the distance d, whereas in a case where Relationship (2) is not satisfied, the image processing on the obtained image may be completed before the next image is captured, which impairs the actions and effect of the present embodiment, namely that image capturing is first carried out N times and the image processing is carried out thereafter.

$$d \geq V \times T1 \quad (1)$$

$$d < V \times (T1+T2) \quad (2)$$

An example of a method for finding the maximum number of times N for image capturing will be described next. For the sake of simplicity, in the present embodiment, when the diameter of a minimum circumscribing circle of the workpiece 12 when the workpiece 12 is viewed from above (in an image capturing direction of the camera 20) is "A," a length "R" of the field of view 36 of the camera 20 with respect to the transport direction of the conveyor 14 is set to a value substantially greater than or equal to A (e.g., A≤R≤ (A×1.2 to 1.5)) in order to increase the detection accuracy of the camera 20 as much as possible.

As illustrated in FIG. 2, an error or skew may arise in the timing of the sensing by the arrival sensor 18 depending on the shape of the workpiece 12, the specifications (e.g., precision) of the arrival sensor 18, etc., for example, the arrival sensor 18 may respond upon the leading end of the workpiece 12 (with respect to the conveyor transport direction) reaching the predetermined position (an installation position of the arrival sensor 18), as indicated by P1 in FIG. 2, and the arrival sensor 18 may respond upon the following end of the workpiece 12 reaching the predetermined position, as indicated by P2.

The maximum number of times N can be found through Equation (3) so that it is applicable to both cases P1 and P2.

$$N=A/(V \times T1)+1 \quad (3)$$

For example, assuming that the workpiece is a retort pouch having a rectangular shape 130 mm wide and 180 mm long (thus having a circumscribing circle having a diameter of 222 mm), the conveyor velocity V is 400 mm/sec, and the image capturing process time T1 is 40 ms, N is 14 based on the above-described Equation (3). Thus, by determining N on the basis of the dimension (A) of the workpiece, the conveyor velocity (V), and the time required for the image capturing process (T1), in a case where the workpiece 12 is sensed at the position P2 (after moving the distance D following the sensing), an image in which the (entire) workpiece 12 is within the field of view 36 of the camera 20 is obtained the first time the image capturing process is carried out, and in a case where the workpiece 12 is sensed at the position P1 (after moving a distance (D+(N−1)×d) following the sensing), an image in which the (entire) workpiece 12 is within the field of view 36 of the camera 20 is obtained the N-th time the image capturing process is carried out, as can also be seen from FIG. 2.

Referring again to FIG. 3, once the image capturing process for a given workpiece (the first workpiece) is complete, it is determined whether or not the second workpiece that follows the first workpiece has been sensed by the arrival sensor 18 already, and the conveyor 14 (the workpiece 12) has advanced greater than or equal to a distance, obtained by subtracting a distance that is the product of the time required for carrying out the image processing one time and the conveyor velocity, from the first movement distance D (D−V×T2) following that sensing (step S5). In a case where these conditions are satisfied, there is a possibility that an image of the second workpiece cannot be captured when the detection process is underway, and thus the image capturing process for the second workpiece is carried out without carrying out the image processing for the first workpiece (steps S2 to S4). In a case where the conditions are not satisfied, the image processing (position detection process) for the first workpiece is carried out (step S6 and S7).

In step S7, the plurality of images captured by the camera 20 are sequentially (e.g., in order from the oldest) subjected to image processing. Here, once an n-th (n<N) image has been successfully detected, the detection process is aborted without carrying out the detection process (image processing) for all N images, and the remaining (unprocessed) images are discarded (steps S8 and S9). Here, "successfully detected (processed)" means that the position (and orientation) of the captured workpiece on the conveyor 14 has been correctly identified in the image processing for a given image. More specifically, in a case where, for example, the position detection processing section 22 uses template matching as a detection processing method, a threshold value (e.g., 70%) can be set in advance for a parameter expressing the detection accuracy of the template matching (e.g., a level of similarity to a pattern). The detection can be determined to be successful, and the detection process can be aborted in a case where the parameter of a given image is greater than or equal to the threshold value. Blob analysis can be given as another example of a detection process in which the same type of processing can be carried out.

Once the (position of the) workpiece has been successfully detected, the robot controller 34 receives information pertaining to the position of the workpiece, etc., from the transport system controller 30, and on the basis of this information, controls the robot 32 to carry out tasks (picking up, transporting, etc.) on the workpiece. On the other hand, the processing illustrated in FIG. 3 is continued while workpieces subject to image capturing and detection are present on the conveyor 14, but is terminated upon receiving a termination command, etc., sent externally.

Figure 4:
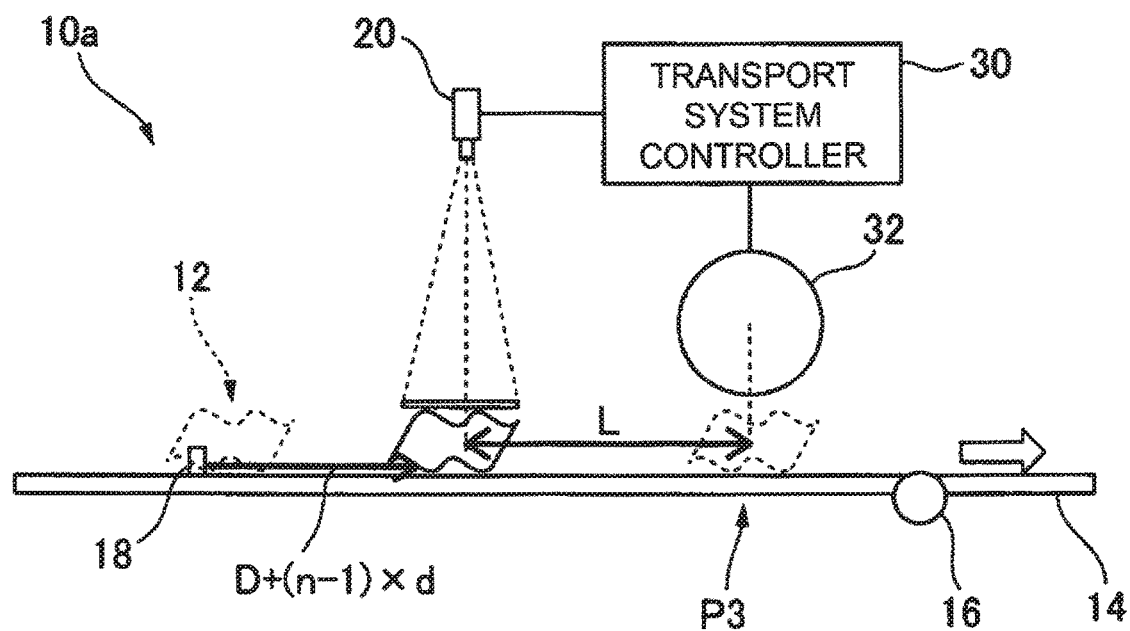
FIG. 4 is a diagram illustrating a positional relationship between a camera and a robot in the first embodiment.

A distance "L" between the camera 20 and the robot 32 with respect to the conveyor transport direction will be described next with reference to FIG. 4. The worst case that can be considered in the present embodiment is a case where the processing always moves to step S2 after step S5, i.e., the detection process cannot be carried out even once before the image capturing process is completed for all K workpieces; more specifically, this is a case where the next workpiece is sensed by the arrival sensor 18 at the timing the image capturing process for each workpiece is completed for the N-th time.

Here, assuming that the first of the K workpieces is within the field of view 36 of the camera 20 in the n-th time the image capturing process is carried out, the distance L between the camera 20 and the robot 32 with respect to the conveyor transport direction should be greater than or equal to a value K found through Equation (4) below for the detection process for the first workpiece to be completed by the time that workpiece moves to a task region center (P3) of the robot 32.

M=(movement distance of conveyor from n-th time the image capturing process is carried out to N-th time the image capturing process for first workpiece is carried out)+(movement distance of conveyor from first time the image capturing process is carried out to N-th time the image capturing process is carried out for remaining workpieces)+(movement distance of conveyor during image processing of n images of first workpiece) (4)

Specifically, the above-described equation is expressed as Equation (5) below.

$$M=\{(N-n) \times d + V \times T1\} + (K-1) \times \{D + (N-1) \times d + V \times T1\} + n \times V \times T2 \quad (5)$$

Relationship (6) below is obtained by applying Relationship (1) to Equation (5), and Relationship (7) is obtained by rearranging Relationship (6).

$$M \le (N-n+1) \times d + (K-1) \times (D + N \times d) + n \times V \times T2 \quad (6)$$

$$M \le K \times (D + N \times d) + (n-1) \times (V \times T2 - d) + V \times T2 - D \quad (7)$$

Relationship (8) is obtained by applying (d>0) to Relationship (7), and furthermore, Relationship (9) is obtained by applying (n≤N) to Relationship (8).

$$M < K \times (D + N \times d) + (n-1) \times V \times T2 + V \times T2 - D \quad (8)$$

$$M < K \times (D + N \times d) + N \times V \times T2 - D \quad (9)$$

In Relationship (9), the first term corresponds to a maximum movement distance of the conveyor while waiting to capture an image and during the image capturing process for all of the workpieces; the second term corresponds to the movement distance of the conveyor during the detection processes on all of the images of the first object; and the third term corresponds to the movement distance of the conveyor between when an object is sensed by a phototube sensor to when an image of the object is first captured. Accordingly, by setting the distance L between the camera 20 and the robot 32 with respect to the conveyor transport direction to a value greater than or equal to the right side of Relationship (9), appropriate workpiece carrying and removing operations can be carried out in accordance with the actual supply state of the workpiece in the system.

In Embodiment 1, the camera 20 captures an image of the workpiece 12 each time the workpiece 12 moves a predetermined image capturing interval d after the arrival of the workpiece 12 is sensed by the arrival sensor 18. Once the workpiece 12 has been successfully detected through the detection process for a given image, the subsequent detection processes can be rendered unnecessary (aborted). In the prior art, when transporting a workpiece using a conveyor, there are cases where too many workpieces are temporarily supplied, a next workpiece moves downstream from the field of view of the camera before the image capturing process and detection process are completed for a given workpiece, and some workpieces remain unrecognized as a result; however, according to Embodiment 1, the image capturing is prioritized when there is a workpiece present in the field of view of the camera 20 and the detection processes for captured images are scheduled for when there are no workpieces in the field of view, which makes it possible to prevent workpieces from remaining unrecognized.

Embodiment 2

A second embodiment of the present disclosure (Embodiment 2) will be described next. Note that only parts different from Embodiment 1 will be described in Embodiment 2, and descriptions for parts that are the same as in Embodiment 1 will be omitted.

In Embodiment 1, the image capturing process and the detection process are both carried out, one time without interruption. However, in Embodiment 2, although the image capturing process is carried out one time without interruption, the detection process can be carried out one time while being interrupted, which makes it possible to make the distance between the camera and the robot (L in FIG. 4) shorter than in Embodiment 1.

Specifically, when, while the detection process is underway for the first workpiece for which an image has already been captured N times, the conveyor 14 has furthermore moved by D after the second workpiece following the first workpiece has been sensed by the arrival sensor 18, the detection process for the first workpiece is interrupted and the interrupted detection process is resumed when the image capturing process for the second workpiece is not underway. Doing so makes it possible to make the distance L between the camera 20 and the robot 32 shorter than in Embodiment 1 by the distance the conveyor moves while waiting for the image capturing process, and more specifically, by a maximum of a value L' calculated through Equation (10) below.

$$L' = (K-1) \times V \times T2 + K \times N \times (d - V \times T1) \quad (10)$$

Embodiment 3

A third embodiment of the present disclosure (Embodiment 3) will be described next. Note that only parts different from Embodiment 1 will be described in Embodiment 3, and descriptions for parts that are the same as in Embodiment 1 will be omitted.

Embodiment 3 implements the image capturing more efficiently in a case where the workpieces flow in a denser state than in Embodiment 1. Specifically, although Embodiment 1 carries out operations in which "the camera 20 first captures an image of a workpiece 12 upon the conveyor 14 having advanced by the first movement distance D after the arrival of the workpiece 12 on the conveyor 14 has been sensed by the arrival sensor 18, and then the camera 20 captures an image of the workpiece 12 each time the conveyor 14 has advanced by the second movement distance d, up to the maximum number of times N", in Embodiment 3, the image capturing process for a previous workpiece is aborted, and the image capturing process for the next workpiece is started, upon the conveyor 14 having moved by D after the next workpiece has been sensed by the arrival sensor 18.

Figure 5:
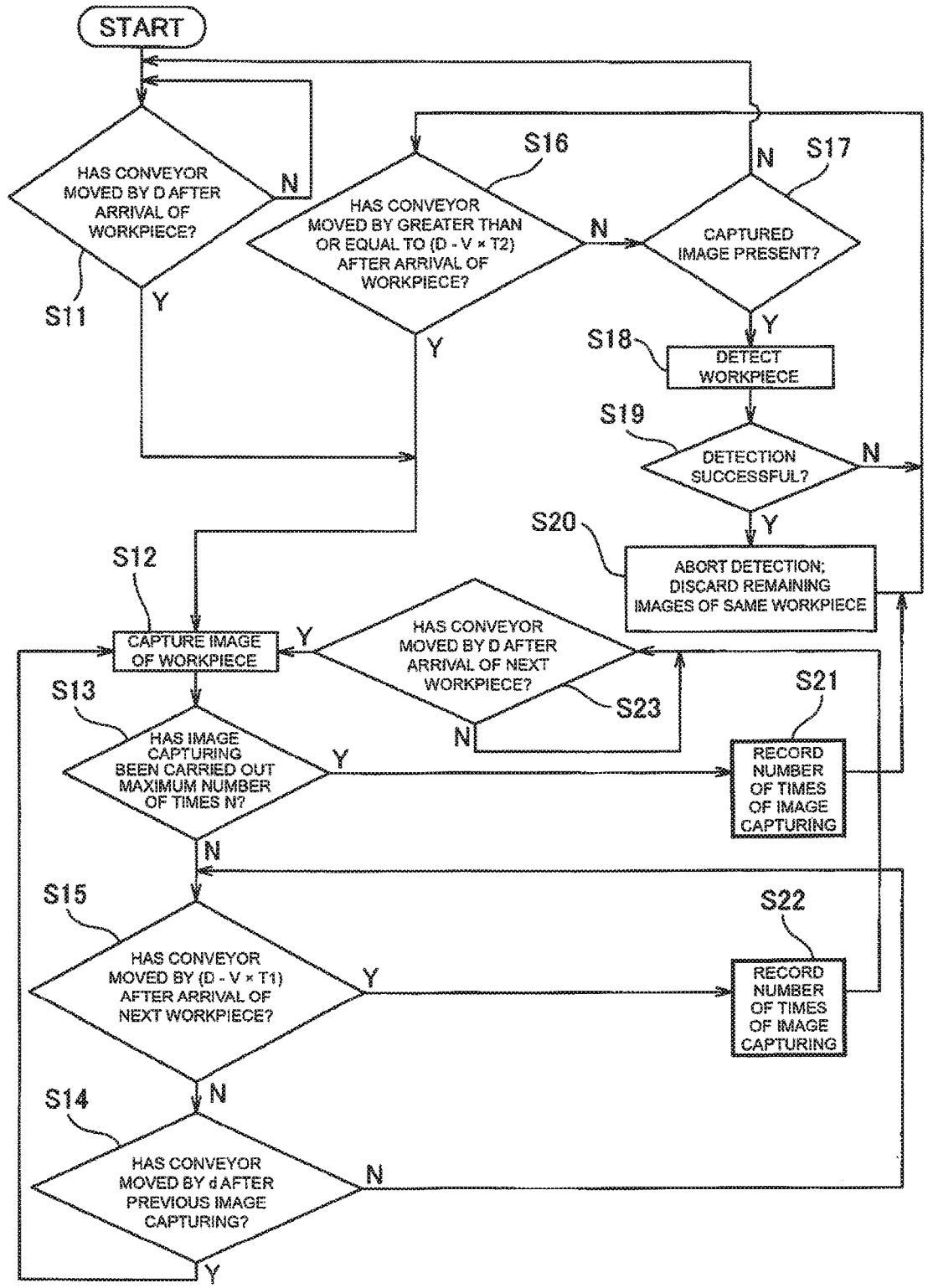
FIG. 5 is a flowchart illustrating an example of a flow of processing in a third embodiment.

FIG. 5 is a flowchart illustrating an example of a flow of processing in Embodiment 3. First, the camera 20 captures an image of a given (a first) workpiece 12 at the point in time when the conveyor 14 (the workpiece 12) has advanced by the first movement distance D from when the arrival of the workpiece 12 has been sensed by the arrival sensor 18 (steps S11 and S12). Thereafter, the image capturing process for the workpiece 12 is repeated each time the conveyor 14 advances by the second movement distance d, up to the predetermined maximum number of times N (steps S13 and S14); however, in a case where before the process is repeated N times, the conveyor 14 has moved by (D−V×T1) after the next workpiece has been sensed by the arrival sensor 18, an image of the next workpiece, rather than the previous workpiece, is captured, and that image capturing is carried out at the timing at which the conveyor 14 has moved by D after the arrival sensor 18 has sensed the next workpiece (steps S15 and S23).

The image capturing of the next workpiece is prioritized because the field of view of the camera 20 is, as described above, often made as narrow as possible to increase the detection accuracy; in such a case, it is conceivable that when the conveyor has advanced by D after the next workpiece is sensed by the arrival sensor 18, the next workpiece will already be within the field of view 36 of the camera 20, and the previous workpiece will not be completely within the field of view 36.

The detection process using the captured image (steps S16 to S20) may be the same as in Embodiment 1 (FIG. 3), and thus detailed descriptions thereof will be omitted. Note that when the detection process is aborted and the remaining images for that same workpiece are discarded (step S20), it is preferable that the number of times the image capturing has been carried out to be recorded when aborting the image capturing process in order to determine how many of the images is to be discard (steps S21 and S22).

Figure 6:
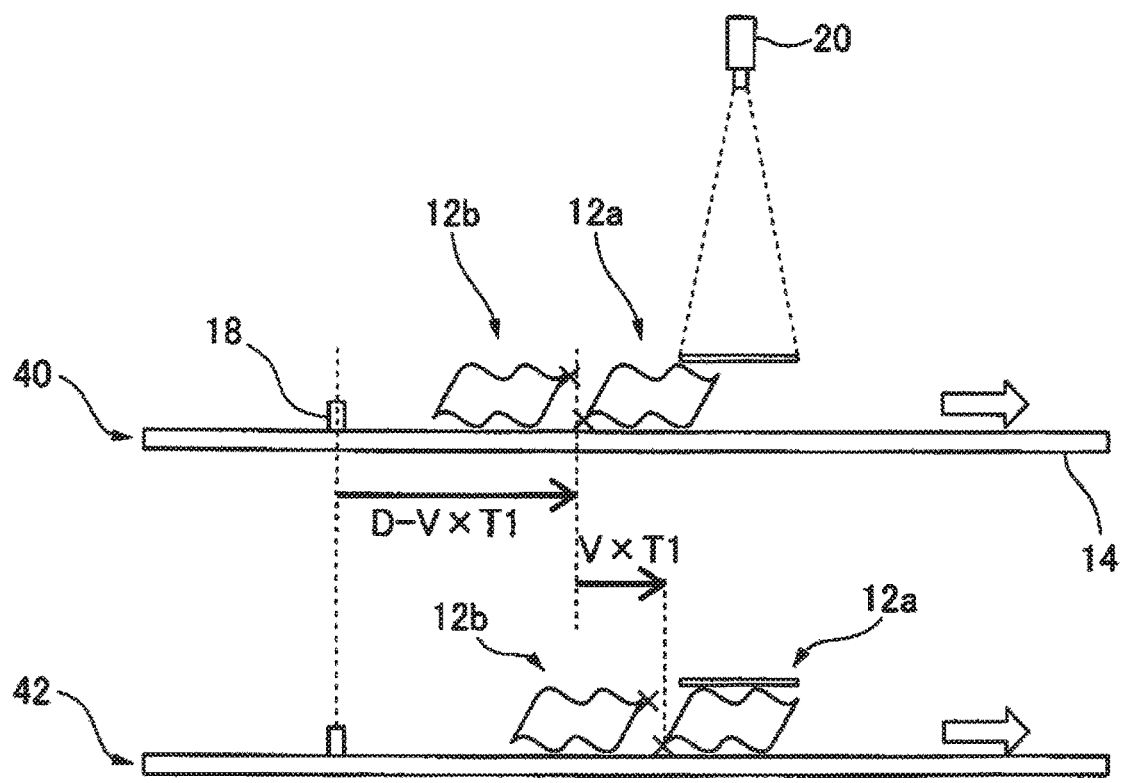
FIG. 6 is a diagram illustrating an example of a positional relationship between workpieces in the third embodiment.

FIG. 6 is a diagram illustrating processing for eliminating the possibility that an image of a given workpiece will not be captured even once, in Embodiment 3. In step S15, when the conveyor 14 has advanced by (D−V×T1) after a next workpiece 12a has been sensed by the arrival sensor 18 (upper section 40 in FIG. 6), the image capturing process for the previous workpiece (not illustrated) is aborted, and the image capturing of the workpiece 12a is carried out for the first time at the point in time when the conveyor 14 has further advanced by D (lower section 42 in FIG. 6). This is processing in which the image capturing for the workpiece 12a carried out for the first time is not aborted even in a case where a next workpiece 12b that follows the workpiece 12a has already been sensed by the arrival sensor 18.

Although the image capturing for the workpiece 12b carried out for the first time will be delayed in this case, the case illustrated in FIG. 6 is originally one that can arise when the arrival sensor 18 has sensed both the following end of the workpiece 12a and the leading end of the workpiece 12b. Thus, no matter how much the image capturing process for the workpiece 12b carried out for the first time is delayed, a problem in which the detection process for the workpiece 12b does not succeed will not arise.

Embodiment 4

A fourth embodiment of the present disclosure (Embodiment 4) will be described next. Embodiment 4 differs from Embodiment 3 only in the following ways. Although the image capturing process and the detection process are both carried out one time without interruption in Embodiment 3, in Embodiment 4, the image capturing process is carried out one time without interruption but the detection process can be carried out one time while being interrupted. Through this, the distance between the camera and the robot (L in FIG. 4) can be made shorter in Embodiment 4 than in Embodiment 3, similar to the relationship between Embodiments 1 and 2.

Specifically, when, while the detection process is underway for the first workpiece for which an image has already been captured the maximum number of N times, the conveyor 14 has furthermore moved by D after the second workpiece following the first workpiece has been sensed by the arrival sensor 18, the detection process for the first workpiece is interrupted and the interrupted detection process is resumed after the image capturing process for the second workpiece has completed the maximum number of N times. Doing so makes it possible to make the distance L between the camera 20 and the robot 32 shorter than in Embodiment 3 by the distance the conveyor moves while waiting for the image capturing process; more specifically, when the number of times the image capturing is carried out for K workpieces is represented by P, the distance L can be made shorter by a maximum of a value L" calculated through Equation (11) below.

$$L''=(P-K)\times(d-V\times T1) \qquad (11)$$

Here, assuming that the workpiece is rectangular in shape (when viewed from above) and the length of a short side of the workpiece is represented by a1, a case where the K workpieces flow continuously with the long sides thereof in contact with each other results in the image capturing being carried out the fewest times, and a minimum value of P at that time is expressed by Relationship (12) below. In this case, the distance L between the camera 20 and the robot 32 can be made shorter than in Embodiment 3 by a maximum of a value L''' calculated through Equation (13) below. Note that [K×(a1−V×T1)/d] in Relationship (12) and Equation (13) is a function (a floor function) expressing the integer part of (K×(a1−V×T1)/d).

$$P\geq 1+[K\times(a1-V\times T1)/d] \qquad (12)$$

$$L'''=\{1+[K\times(a1-V\times T1)/d]-K\}\times(d-V\times T1) \qquad (13)$$

Embodiment 5

In Embodiments 1 to 4, when determining the success of the detection process as described in step S8 or S19, a threshold value of a parameter expressing the detection accuracy in the detection process is designated in advance, and the detection is determined to be successful, and the subsequent detection process is aborted, when the parameter has become greater than or equal to the threshold value in the detection process for a given image. On the other hand, in embodiment 5, the detection process may be carried out at least once on the next image even in the case where the parameter has become greater than or equal to the threshold value, and the detection result at which the parameter that has become greater than or equal to the threshold value is a maximum value may be employed as the position detection result of that workpiece. In Embodiments 1 to 4, the parameter often indicates a maximum value after becoming greater than or equal to the threshold value (e.g., 70%->80%-

>70%), and thus this method makes it possible to employ a more accurate detection result. Thus, in this case, it is preferable that the detection process be aborted at the point in time when the parameter expressing the detection accuracy starts to drop.

According to the present disclosure, the positions of workpieces on a conveyor can be detected accurately while preventing workpieces from remaining unrecognized, even in cases where the timing at which the arrival of each workpiece is sensed by an arrival sensor is unstable.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. An article transport system comprising:
    a conveyor configured to transport a plurality of articles;
    a conveyor sensor configured to obtain conveyance operation information of the conveyor;
    an arrival sensor configured to sense an arrival of each of the plurality of articles;
    an image capturing apparatus configured to capture an image of each of the plurality of articles transported on the conveyor;
    a position detection processing section configured to detect each of the plurality of articles from the image captured by the image capturing apparatus, and carry out a detection process identifying a position of each of the plurality of articles;
    a movement distance designation section configured to designate a first movement distance determined, based on a velocity of the conveyor and a time required for the detection process, and a second movement distance determined, based on the velocity of the conveyor, a time required for an image capturing process of the image capturing apparatus, and the time required for the detection process;
    an image capturing control section configured to control the image capturing apparatus to capture an image of each of the plurality of articles upon the conveyor advancing the first movement distance after the arrival of the article has been sensed, and then, to capture an image of each of the articles each time the conveyor advances the second movement distance; and
    a number designation section configured to designate a maximum number of times for the image capturing process to be carried out by the image capturing apparatus,
    wherein the position detection processing section sequentially carries out the detection process for the images obtained by the image capturing apparatus after the image capturing apparatus has completed the image capturing process a number of times, a maximum of the number of times being the maximum number of times, and aborts the detection process at a point in time when the detection process has succeeded.

2. The article transport system of claim 1, wherein in a case where the conveyor has advanced greater than or equal to a distance obtained by subtracting a distance that is a product of the velocity of the conveyor and the time required for the image capturing process from the first movement distance, when, after the arrival sensor has sensed the arrival of a first article among the plurality of articles, the arrival sensor has sensed a second article following the first article before the image capturing apparatus has completed the image capturing the maximum number of times, the image capturing of the first article is ended before the number of times the image capturing of the article is carried out reaches the maximum number of times, and the image capturing of the second article is started.

3. The article transport system of claim 1, wherein when, while the detection process is carried out for a first article among the plurality of articles, the conveyor has further moved by the first movement distance after the arrival sensor has sensed a second article following the first article, the position detection processing section interrupts the detection process for the first article, and resumes the detection process for the first article upon the image capturing process for the second article being completed a second number of times, a maximum of the second number of times being the maximum number of times.

4. The article transport system of claim 1,
    wherein the position detection processing section designates a threshold value of a parameter expressing a detection accuracy of the detection process in advance, carries out the detection process at least once after the parameter has become greater than or equal to the threshold value, and employs, as a position detection result, a detection result from when the parameter that has become greater than or equal to the threshold value is a maximum value.

5. The article transport system of claim 1, further comprising:
    a task machine configured to carry out a predetermined task on the plurality of articles transported on the conveyor,
    wherein the task machine carries out the task, based on the position of each of the plurality of articles on the conveyor identified by the position detection processing section.

6. A transport system controller used in an article transport system, the article transport system including: a conveyor configured to transport a plurality of articles; a conveyor sensor configured to obtain conveyance operation information of the conveyor; an arrival sensor configured to sense an arrival of each of the plurality of articles; and an image capturing apparatus configured to capture an image of each of the plurality of articles transported on the conveyor, the transport system controller comprising:
    a position detection processing section configured to detect each of the plurality of articles from the image captured by the image capturing apparatus, and carry out a detection process identifying a position of each of the plurality of articles;
    a movement distance designation section configured to designate a first movement distance determined, based on a velocity of the conveyor and a time required for the detection process, and a second movement distance determined, based on the velocity of the conveyor, a time required for an image capturing process of the image capturing apparatus, and the time required for the detection process;
    an image capturing control section configured to control the image capturing apparatus to capture an image of each of the plurality of articles upon the conveyor advancing the first movement distance after the arrival of each of the plurality of articles has been sensed, and then, to capture an image of each of the plurality of articles each time the conveyor advances the second movement distance; and a number designation section configured to designate a maximum number of times for the image capturing process to be carried out by the image capturing apparatus, wherein the position detection processing section sequentially carries out the detection process for the images obtained by the image capturing apparatus after the image capturing apparatus has completed the image capturing process a number of times, a maximum of the number of times being the maximum number of times, and aborts the detection process at a point in time when the detection process has succeeded.

* * * * *